US008925692B2

(12) United States Patent
Funke et al.

(10) Patent No.: US 8,925,692 B2
(45) Date of Patent: Jan. 6, 2015

(54) ELECTROMECHANICALLY ACTUABLE PARKING BRAKE FOR MOTOR VEHICLES AND A METHOD FOR ACTUATING THE SAME

(75) Inventors: Joachim Funke, Otzberg (DE); Rüdiger Puff, Hünstetten-Wallbach (DE); Jürgen Völkel, Frankfurt am Main (DE)

(73) Assignee: Continental Teves AG & Co oHG (DE)

( * ) Notice: Subject to any disclaimer, the term of this patent is extended or adjusted under 35 U.S.C. 154(b) by 1011 days.

(21) Appl. No.: 12/676,501

(22) PCT Filed: Sep. 4, 2008

(86) PCT No.: PCT/EP2008/061686
§ 371 (c)(1),
(2), (4) Date: Mar. 4, 2010

(87) PCT Pub. No.: WO2009/030726
PCT Pub. Date: Mar. 12, 2009

(65) Prior Publication Data
US 2010/0252381 A1    Oct. 7, 2010

(30) Foreign Application Priority Data

Sep. 5, 2007  (DE) .......................... 10 2007 042 203
Sep. 4, 2008  (DE) .......................... 10 2008 045 693

(51) Int. Cl.
| F16D 51/00 | (2006.01) |
| F16D 65/22 | (2006.01) |
| B60T 7/12 | (2006.01) |
| B60T 13/74 | (2006.01) |
| F16D 121/24 | (2012.01) |
| F16D 125/40 | (2012.01) |
| F16D 125/52 | (2012.01) |

(52) U.S. Cl.
CPC .................. *F16D 65/22* (2013.01); *B60T 7/122* (2013.01); *B60T 13/741* (2013.01); *F16D 2121/24* (2013.01); *F16D 2125/40* (2013.01); *F16D 2125/52* (2013.01)
USPC ........................................ 188/79.51; 188/79.52

(58) Field of Classification Search
CPC ...... F16D 65/22; B60T 2201/06; B60T 7/122; B60T 17/221
USPC ............ 188/156, 79.51, 79.52, 331, 326, 332
See application file for complete search history.

(56) References Cited

U.S. PATENT DOCUMENTS 2,295,758  A  *  9/1942  Safford .................... 188/79.56
2,345,062  A  *  3/1944  Nachtwey ................ 188/79.52

(Continued)

FOREIGN PATENT DOCUMENTS

DE          197 38 877 A1    9/1998
DE    10 2004 049 434 A1   10/2005

(Continued)

OTHER PUBLICATIONS

Korean Office Action dated corresponding to KR 2010-7007281 dated Jun. 25, 2014. (English translation only).

*Primary Examiner* — Vishal Shani
(74) *Attorney, Agent, or Firm* — RatnerPrestia

(57) ABSTRACT

A system and method for an electromechanically actuable parking brake for motor vehicles, which is embodied as a drum brake of the "duo-servo" type. The parking brake has a brake actuating device which can be actuated by an electromechanical actuator, is designed as an expander element and acts on two brake shoes, the expander element being supported via a spring energy storage device, may be designed as a diaphragm spring assembly, and being spreadable by a predetermined length of travel, when the parking brake is actuated, to apply an application force. In order to provide a sufficiently large hot parking travel, the length of travel travelled by the expander element to apply the application force when the parking brake is actuated can be moved as a function of at least one motor vehicle state parameter.

10 Claims, 3 Drawing Sheets

(56) References Cited

U.S. PATENT DOCUMENTS

| | | | |
|---|---|---|---|
| 4,629,043 A | 12/1986 | Matsuo et al. | |
| 4,706,784 A * | 11/1987 | Shellhause | 188/79.52 |
| 4,928,797 A * | 5/1990 | Harrison | 188/156 |
| 5,823,636 A * | 10/1998 | Parker et al. | 303/3 |
| 6,249,737 B1 | 6/2001 | Zipp | |
| 6,318,513 B1 * | 11/2001 | Dietrich et al. | 188/72.7 |
| 6,446,768 B2 * | 9/2002 | Kikuta et al. | 188/162 |
| 6,460,660 B1 * | 10/2002 | Shaw et al. | 188/79.56 |
| 6,877,589 B2 * | 4/2005 | Ikeda | 188/79.52 |
| 7,925,408 B2 * | 4/2011 | Shiraki | 701/70 |
| 2003/0183465 A1 * | 10/2003 | Ikeda | 188/325 |
| 2006/0151264 A1 * | 7/2006 | Ikeda | 188/79.51 |
| 2006/0278477 A1 | 12/2006 | Balz et al. | |
| 2007/0151818 A1 * | 7/2007 | Linhoff et al. | 188/326 |
| 2008/0071454 A1 | 3/2008 | Shiraki | |

FOREIGN PATENT DOCUMENTS

| | | | |
|---|---|---|---|
| DE | 10 2005 056 221 A1 | | 7/2006 |
| DE | 10 2007 043 620 A1 | | 3/2008 |
| EP | 1 787 882 A1 | | 5/2007 |
| JP | 2004-175203 | | 6/2004 |
| JP | 2004-142517 | * | 5/2014 |
| WO | WO 2004/059189 A1 | | 7/2004 |
| WO | WO 2005/070736 | * | 8/2005 |

* cited by examiner

US 8,925,692 B2

ELECTROMECHANICALLY ACTUABLE PARKING BRAKE FOR MOTOR VEHICLES AND A METHOD FOR ACTUATING THE SAME

CROSS REFERENCE TO RELATED APPLICATIONS

This application is the U.S. national phase application of PCT International Application No. PCT/EP2008/061686, filed Sep. 4, 2008, which claims priority to German Patent Application No. 10 2008 045693.4, filed Sep. 4, 2008 and German Patent Application No. 10 2007 042203.4, filed Sep. 5, 2007, the contents of such application being incorporated by reference herein.

BACKGROUND OF THE INVENTION

1. Field of the Invention

The present invention relates to an electromechanically actuable parking brake for motor vehicles, which is embodied as a drum brake, preferably of the "duo-servo" type, having a brake actuating device which can be actuated by an electromechanical actuator, is designed as an expander element and acts on two brake shoes, the expander element being supported via a spring energy storage device, which is preferably designed as a diaphragm spring assembly, and being spreadable by a predetermined length of travel, when the parking brake is actuated, to apply an application force. The invention furthermore relates to a method for actuating a parking brake of this kind.

2. Description of the Related Art

The term "drum brake" is taken to mean a brake in which brake linings interact with a cylindrical surface. When the brake is actuated, they are pressed against an encircling drum from the outside or the inside. A characteristic feature of a drum brake of the "duo servo" type is a freely movable or floating support device which lies opposite a brake actuating device in the form of an expander lock (also referred to as an expander module or expander element) and is arranged between the brake shoes. A duo-servo brake of this kind is often accommodated in the pot of the rear disk brake and is used as a parking brake, especially on motor vehicles of relatively large mass subject to exacting requirements as regards comfort.

Printed publication WO 2004/059189 A1, which is incorporated by reference, relates to an electromechanically actuable parking brake of this kind for motor vehicles, said brake being embodied as a drum brake of the "duo-servo" type. The expander element (expander lock) is formed by a threaded nut/spindle arrangement, the threaded nut of which is driven by an electromechanical actuator via a helical gear. The actuation of the threaded nut by the actuator imparts a translational motion to the spindle and brings the two brake shoes into engagement with the brake drum with the desired application force. As a result, the application force is reliably assured during a braking operation for parking, even when the brake linings are worn.

An electromechanically actuable parking brake embodied as a drum brake of the "duo-servo" type is likewise known from printed publication DE 10 2004 049 434 A1, which is incorporated by reference. The expander element of this drum brake is formed substantially by a threaded nut/spindle arrangement and two pressure pieces, one pressure piece interacting with the spindle and the other pressure piece interacting with the threaded nut. A spring element (spring energy storage device) is provided in the force transmission path between the threaded nut/spindle arrangement and the pressure piece interacting with the threaded nut. If the motor vehicle is parked on a slope, there is a slight movement of the motor vehicle in the direction of the downward force associated with the slope after the desired application force has been set. During this process, the brake drum rotates by a certain angle until the self-energizing effect characteristic of a drum brake of the "duo-servo" type takes effect. As a consequence, the desired application force is first of all reduced, this being compensated for by the spring element.

In the abovementioned electromechanically operated duo-servo brake, the expansion force does not fall below the level of the design force in any braking operation for parking. If the motor vehicle is parked on a level surface or a slope with a relatively shallow inclination, there is no change in this configuration, even though the inclination of the slope will probably be less than that for which the system has been designed in most cases. The effect of this design is that, when the parking brake is actuated, the expander element is spread apart by a length of travel that takes into account a minimum holding moment and the expansion travel that needs to be provided for the duo-servo effect, based on the design slope force. With such a design there is the problem that, in a critical case, in which the motor vehicle is parked on a level surface while still "hot", i.e. with a hot disk brake or other heated elements of the parking brake, it is no longer possible to release the parking brake after cooling. This is due to the fact that, after the motor vehicle cools down, the brake drum, against which the shoes are resting, contracts, with the result that the application force increases and the system is shifted towards larger forces in the force/travel diagram. In the worst case, this effect can increase the application force to such an extent that it is no longer possible to disengage the brake or that brake components are destroyed.

SUMMARY OF THE INVENTION

It is therefore an object of the present invention to provide an electromechanically actuable parking brake of the "duo-servo" type which avoids binding of the parking brake if the vehicle is parked on a level surface while hot and, at the same time, provides a holding moment which allows the motor vehicle to be secured safely at all times, even on a slope. The object furthermore comprises specifying a corresponding method for actuating an electromechanically actuable parking brake.

The above object is achieved by a parking brake in which the length of travel travelled by the expander element to apply the application force when the parking brake is actuated can be set as a function of at least one motor vehicle state parameter.

The advantage of the parking brake according to aspects of the invention consists in that, through the matching of the parking brake to the motor vehicle state parameters, such as slope inclination, temperature etc., sufficient travel or a sufficiently large force interval to prevent the brake from binding is made available for the critical case where the vehicle is parked on a level surface while hot.

In a preferred embodiment example, the length of travel travelled by the expander element can be set as a function of the actual inclination of the slope on which the vehicle is parked. In this case especially, no additional travel of the expander element is set to compensate for a nonexistent slope inclination when actuating the parking brake for parking the motor vehicle on a level surface. This increases the interval in the force/travel diagram of the parking brake which is available for parking the motor vehicle without risk while hot and in which the forces are still not too great. Conversely, for parking the motor vehicle the actual and current slope inclination value made available by the inclination sensor of the motor vehicle is taken into account in the length of travel travelled by the expander element, thus ensuring that the required slope holding moment is always produced.

It is therefore preferred if a first length of travel travelled by the expander element can be set in the case of a slope, the inclination of which is below a threshold value, and a second length of travel, which is greater than the first length of travel by an additional length of travel component, can be set in the case of a slope, the inclination of which is equal to the threshold value or above the threshold value, the additional length of travel component taking into account the length of travel used up by the parking brake when parking on the slope owing to the additional application force required. It is also possible for a number of such threshold values (stepwise setting) or infinitely variable setting to be provided.

In a preferred embodiment example, the set length of travel of the expander element can alternatively or additionally be set as a function of the brake and/or engine temperature of the motor vehicle. It is thereby possible to make the system safer in boundary cases since, in this embodiment example, the critical situation of parking the vehicle on a level surface while hot can be detected directly. It is preferable if detection means are provided for this purpose which detect the temperature profile of the brake after the motor vehicle has been parked, it being possible for the temperature profile detected to be taken into account when the length of travel travelled by the expander element is being set. Based on the information from the temperature model of the brake, the "weak" readjustment on a level surface made possible by the spring energy storage device can be employed, for example, when the brake has been operated to a high temperature above a threshold value, to be appropriately defined, and the rolling away of the vehicle after it has been parked is simultaneously monitored for a specified cooling time, e.g. several minutes.

It would also be conceivable in this context to determine the slope inclination indirectly. It is also possible, in addition, for the magnitude of the expansion force to be specified, on the initiative of the driver, by means of the actuating duration of the brake actuating device, for example.

The above object is furthermore achieved by a method in which the length of travel which the expander element travels in the spreading motion when the parking brake is actuated is set as a function of at least one motor vehicle state parameter. The length of travel travelled by the expander element is preferably set as a function of the actual inclination of the slope on which the vehicle is parked.

In addition to the abovementioned advantages, lower loads on all the force- and moment-transmitting components can furthermore be expected when using the method according to aspects of the invention since the inclination of the slope will generally be relatively small in most cases and the braking force exerted will be relatively small overall. This applies particularly to the spring element. As a result, the life of the spring element, the actuator and the electronic hardware is longer.

In the embodiment controlled in a stepwise manner, it is preferable if a first length of travel travelled by the expander element is set in the case of a slope, the inclination of which is below a threshold value, and a second length of travel, which is greater than the first length of travel by a length of travel component, is set in the case of a slope, the inclination of which is above the threshold value, taking into account a built-in hysteresis of the threshold value, the length of travel component taking into account the length of travel used up by the parking brake when parking on the slope.

As an alternative or in addition, the set length of travel of the expander element can be set as a function of the brake and/or engine temperature of the motor vehicle. In a preferred embodiment example, the temperature profile of the brake after the motor vehicle has been parked can be detected, it being possible for the temperature profile detected to be taken into account when the length of travel travelled by the expander element is being set.

Further features, advantages and possible uses of the present invention will also emerge from the following description of an embodiment example of a parking brake according to aspects of the invention with reference to figures. In this context, all the features described and/or illustrated by figures form the subject matter of the present invention, either individually or in any desired combination, even if they appear independently of their joint presentation in the claims and references to preceding claims contained therein.

BRIEF DESCRIPTION OF THE DRAWINGS

In the schematic drawings.

DETAILED DESCRIPTION OF THE PREFERRED EMBODIMENTS

Figure 1:
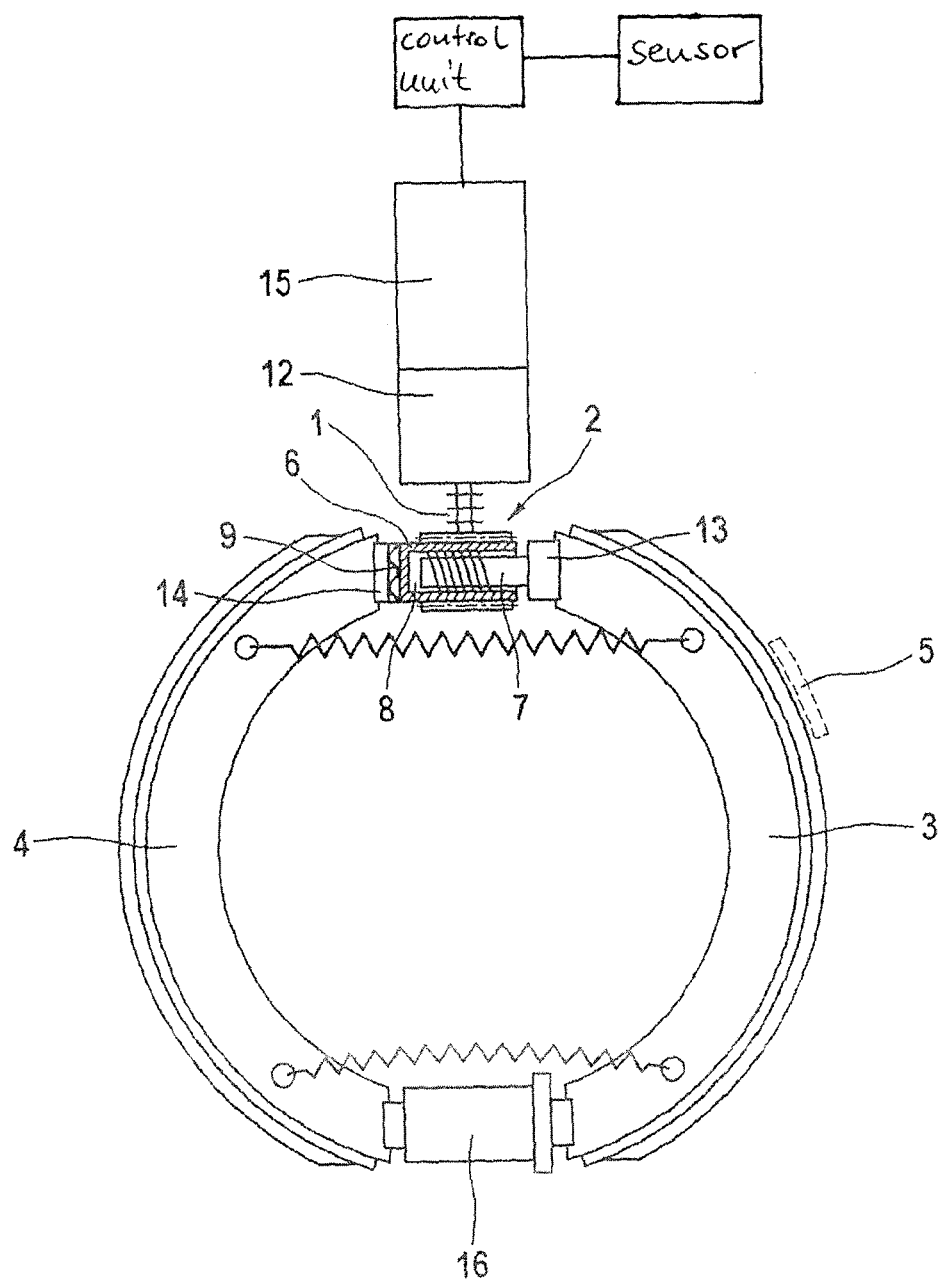
FIG. 1 shows a parking brake according to aspects of the invention in a side elevation.

The electromechanically actuable parking brake illustrated in FIG. 1 substantially comprises a drum brake known per se, of the "duo-servo" type, and an electromechanical actuator 15. The drum brake of the "duo-servo" type has a brake drum 5, which is shown only in part, a pair of brake shoes 3, 4 provided with friction faces, and an expander element (expander lock) 2, which can bring the friction faces of the brake shoes 3, 4 into engagement with the inside of the brake drum 5. A characteristic feature of a drum brake of the "duo servo" type is a freely movable or floating support device 16 which lies opposite the expander element 2 and is arranged between the brake shoes 3, 4. The support device 16 is furthermore combined with a readjustment device.

The expander element 2 is formed substantially by a threaded nut/spindle arrangement 8 and two pressure pieces 13, 14, one pressure piece 13 interacting with the spindle 7 and the other pressure piece 14 interacting with the threaded nut 6. As illustrated in FIG. 1, the threaded nut/spindle arrangement 8 is actuated by a helical gear 1, which is driven by the electromechanical actuator 15 via a reduction gear unit 12 (not described in detail). For this purpose, the threaded nut 6 has on its outer surface toothing which extends parallel to the axis of the threaded nut 6. With this spur toothing of the threaded nut 6, the helical gear 1 forms a helical gear mechanism. When the helical gear 1 is actuated by the electromechanical actuator 15, a rotary motion is imparted to the threaded nut 6. Owing to this rotary motion of the threaded nut 6, the spindle 7 of the threaded nut/spindle arrangement 8 performs a translational motion over a length of travel specified in accordance with the method according to aspects of the invention by a control device, and brings the two brake shoes 3, 4 into engagement with the brake drum 5 with the desired application force by way of a spring element 9, which is designed as a diaphragm spring assembly for example, and the pressure pieces 13, 14.

To enable a braking operation for parking to be performed, either the reduction gear unit 12 or the threaded nut/spindle arrangement 8 is of self-locking design. By virtue of this measure, the brake shoes 3, 4 remain in engagement with the brake drum 5 in the deenergized condition of the electromechanical actuator 15.

Figure 2:
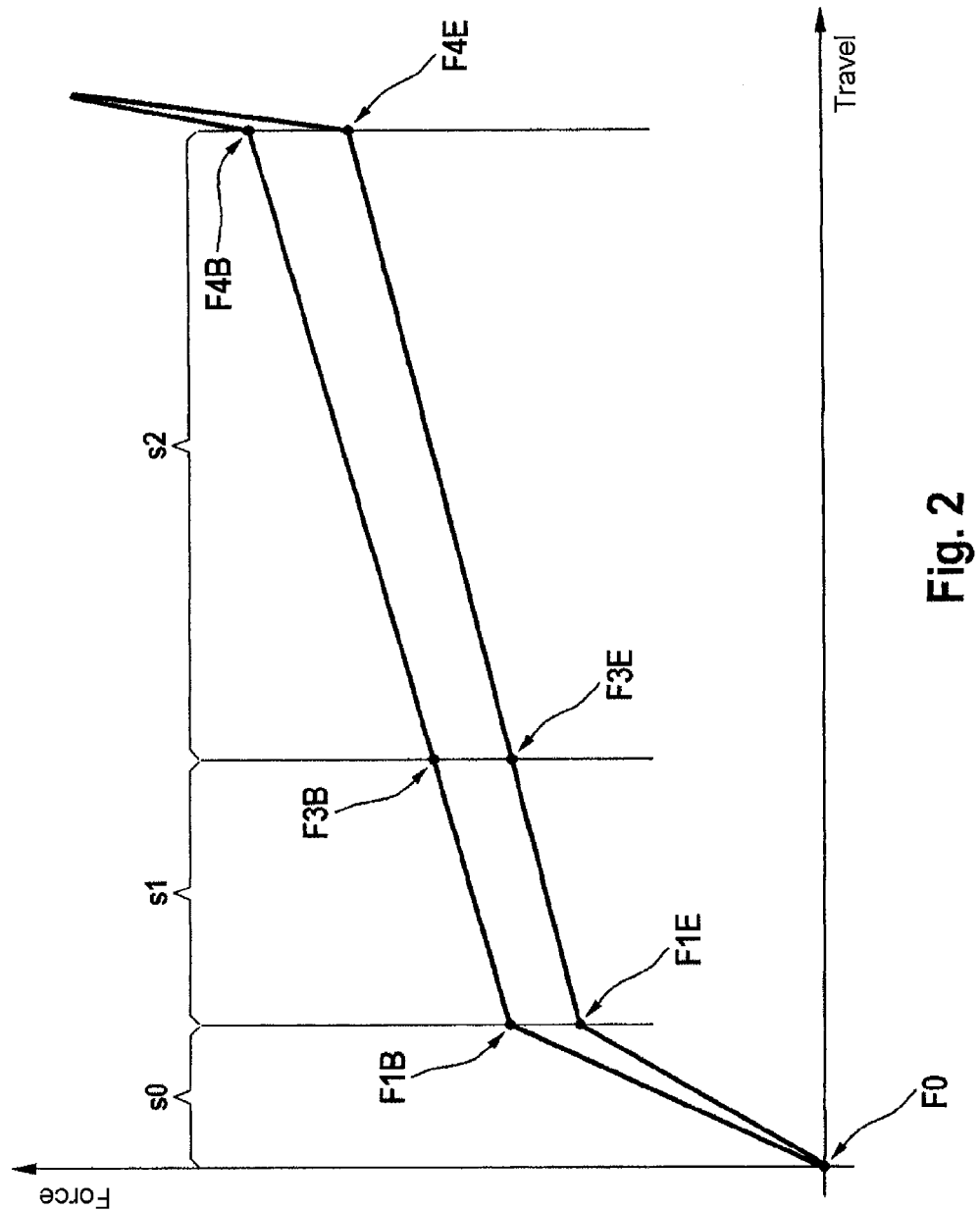
FIGS. 2 and 3 show force/travel diagrams for the parking brake according to aspects of the invention during application and release.

The method according to aspects of the invention for actuating the parking brake will be described below with reference to the diagrams illustrated in FIGS. 2 and 3. The diagrams show the relationship between the length of travel over which the expander element 2 is spread apart and the resulting application force of the brake shoes 3, 4. Here, the upper branch of the force/travel curve shows the situation when applying the parking brake, and the lower branch shows the relationship during release.

When the motor vehicle is parked on a slope having an inclination which is less than a class limit in the case of a stepwise embodiment, the expander element 2 is first of all spread apart by a travel s0 when the parking brake is actuated. In this process, the value of the actual, current slope inclination is made available by a suitable sensor to a control unit, connected to the actuator 15, of the parking brake. During the release of the parking brake, the force exerted through the length of travel s0 corresponds to the minimum expansion force F1E. The point F1B corresponding to the length of travel s0 on the upper branch of the curve is detected with sufficient accuracy by the control unit of the parking brake.

The expander element 2 is furthermore moved by the actuator 15 by a further travel s1, which is referred to as the expansion travel and corresponds to the travel which is used up by the duo-servo effect. s1 is dependent on the slope inclination. Consequently, the system has at least one travel s2 which is uncritical when the motor vehicle is parked while hot and the brake cools down accordingly, and still allows release of the parking brake in the cold state subsequently assumed. s2 is dependent on s1 and on the tolerance chains which determine the overall travel. It is only significantly above point F4B on the force/travel curve that the parking brake can no longer be released or destruction of one or more of the components of the parking brake is caused, and in the present case the length of travel s2 generally provides sufficient travel to compensate for contraction as the parking brake cools down.

Figure 3:
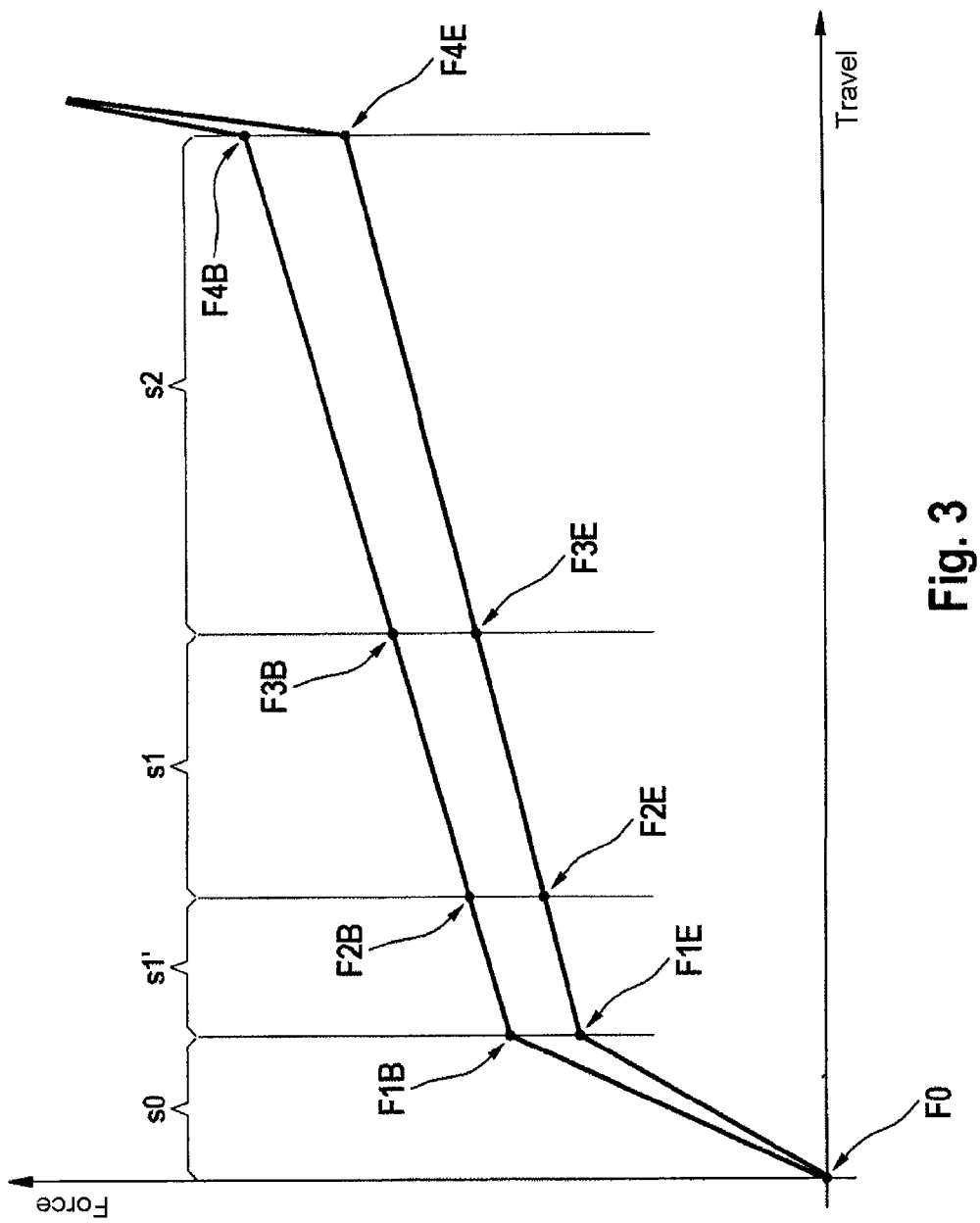

FIG. 3 illustrates the situation that occurs in the force/travel diagram if the motor vehicle is parked on a slope having an inclination above the threshold value in the case of the stepwise design. When the parking brake is actuated, the travel s1' is provided in addition, said travel providing the additional expansion force F2E required for reliably holding the vehicle on the slope having the corresponding inclination. After the onset of the duo-servo effect on the slope, there remains a travel component s2+s1, which is made available to the spring energy storage device for parking while hot, where applicable. Point F4B is not reached in the case of parking while hot, or is only slightly exceeded.

When the design of the spring element is combined with a motor vehicle state parameter, in particular in the case of software that takes into account the slope inclination, the present invention on the one hand has the effect that sufficient hot parking travel is made available in the critical case and, on the other hand, that a minimum slope holding moment for reliably securing the motor vehicle is achieved. At the same time, all the force- and moment-transmitting components are relieved of stress and their service life increased by means of the method according to aspects of the invention and in the parking brake according to aspects of the invention.

The invention claimed is:

1. An electromechanically actuable parking brake for motor vehicles, comprising a drum brake and a control unit, the drum brake having a brake actuating device, actuated by an electromechanical actuator and configured as an expander element which acts on two brake shoes; the expander element being supported via a spring energy storage device, and being spreadable by a predetermined length of travel, when the parking brake is actuated, to apply an application force,
   wherein
   the control unit sets a length of axial travel travelled by the expander element to apply the application force when the parking brake is actuated as a function of at least one motor vehicle state parameter, the at least one motor vehicle state parameter including an inclination of a slope on which the vehicle is parked, such that when the vehicle is parked on a slope having an actual inclination, the control unit sets a first length of axial travel greater than predetermined travel length, the first length determined as a function of the actual inclination of the slope, and a second, different length of axial travel greater than the predetermined travel length when the actual inclination of the slope is above a predetermined threshold value.

2. The parking brake as claimed in claim 1, wherein the drum brake is a duo-servo type drum brake.

3. The parking brake as claimed in claim 1, wherein the spring energy storage device is configured as a diaphragm spring assembly.

4. The parking brake as claimed in claim 1, wherein the first length of axial travel (s0+s1) travelled by the expander element is set in the case of the slope, the inclination of which is below a threshold value, and the second length of axial travel (s0+s1'+s1), which is greater than the first length of axial travel (s0+s1) by an additional length of travel component (s1'), is set in the case of the slope, the inclination of which is equal to the threshold value or above the threshold value, the additional length of travel component (s1') taking into account the length of travel used by the parking brake when parking on the slope owing to the additional application force required.

5. The parking brake as claimed in claim 1, wherein the set length of axial travel of the expander element is further settable as a function of the brake and/or engine temperature of the motor vehicle.

6. The parking brake as claimed in claim 5, wherein detection means are provided which detect the temperature profile of the brake after the motor vehicle has been parked, and wherein the temperature profile detected is taken into account when the length of travel travelled by the expander element is being set.

7. A method for actuating a parking brake, the parking brake comprising a drum brake and a control unit, the drum brake having a brake actuating device, actuated by an electromechanical actuator and configured as an expander element which acts on two brake shoes; the expander element being supported via a spring energy storage device, and being spreadable by a predetermined length of travel, when the parking brake is actuated, to apply an application force,
   wherein the control unit sets a length of axial travel travelled by the expander element in the expanding motion when the parking brake is actuated as a function of at least one motor vehicle state parameter, the at least one motor vehicle state parameter including an inclination of a slope on which the vehicle is parked, such that when the vehicle is parked on a slope having an actual inclination, the control unit sets a first length of axial travel greater than a predetermined travel length, the first length determined as a function of the actual inclination of the slope, and a second, different length of axial travel greater than the predetermined travel length when the actual inclination of the slope is above a predetermined threshold value.

8. The method as claimed in claim 7, wherein the first length of axial travel (s0+s1) travelled by the expander element is set in the case of the slope, the inclination of which is below a threshold value, and the second length of axial travel (s0+s1+s1'), which is greater than the first length of axial travel (s0+s1) by a length of travel component (s1'), is set in the case of the slope, the inclination of which is equal to the threshold value or above the threshold value, the length of travel component (s1') taking into account the length of travel used up by the parking brake when parking on the slope.

9. The method as claimed in claim 7, wherein the set length of axial travel of the expander element is further set as a function of a brake and/or engine temperature of the motor vehicle.

10. The method as claimed in claim 9, wherein a temperature profile of the brake is detected after the motor vehicle has been parked, and wherein the temperature profile detected is taken into account when the length of travel to be travelled by the expander element is being set.

\* \* \* \* \*